Figure 10:
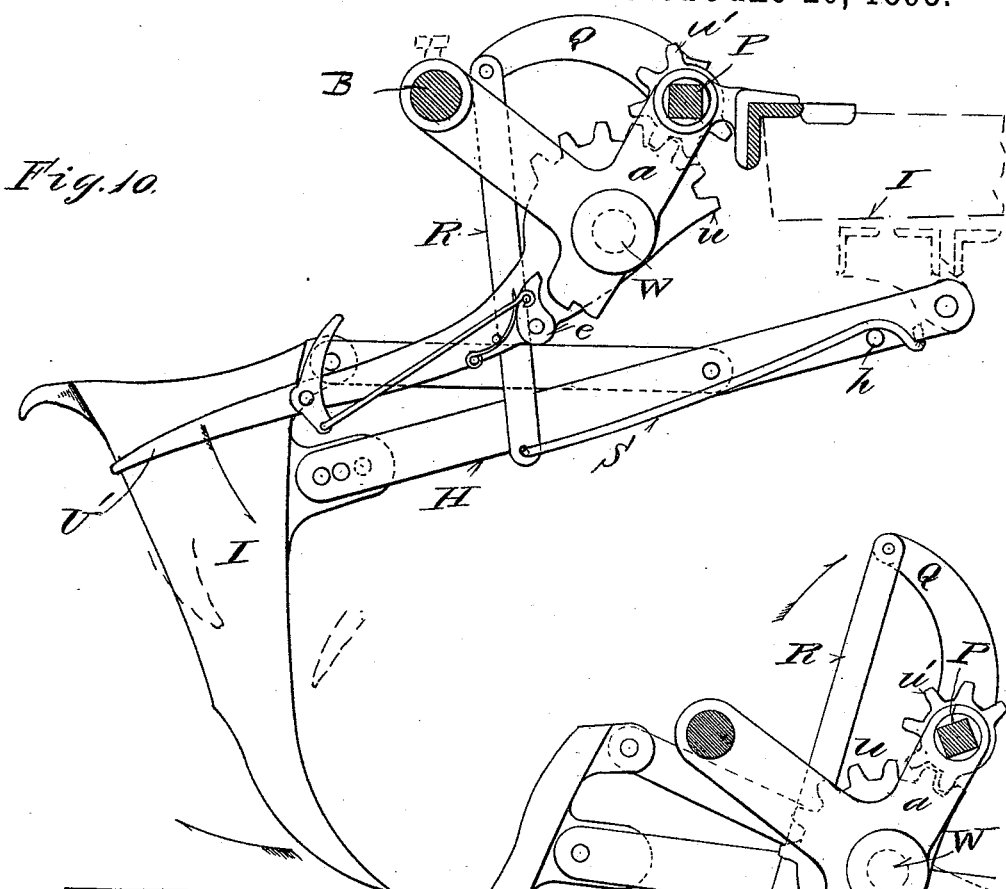

(No Model.) 4 Sheets—Sheet 1.
J. B. NUGENT & H. G. GILBERT.
GRAIN DRILL.
No. 499,849. Patented June 20, 1893.
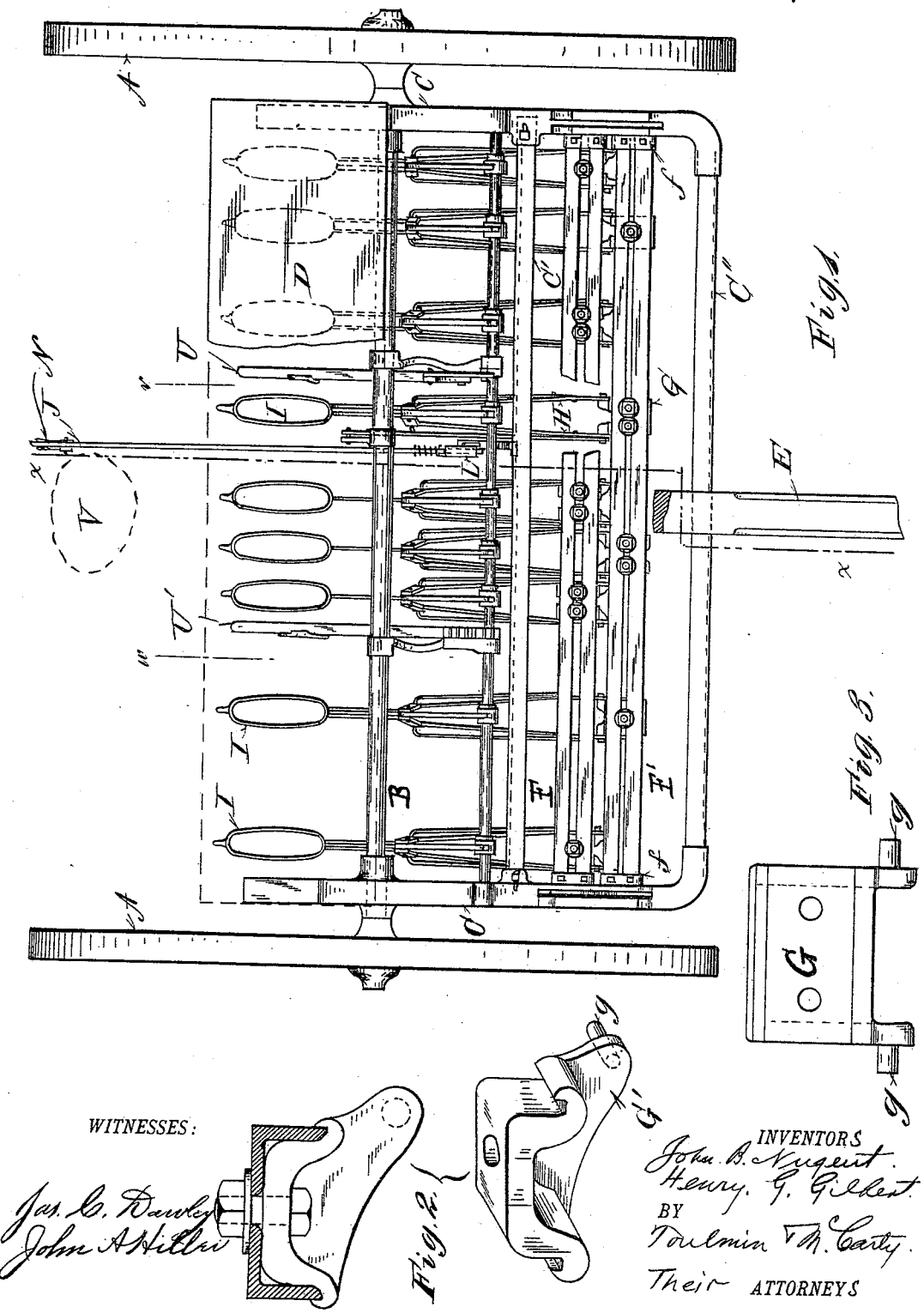
WITNESSES:
Jas. C. Dawley
John A. Hiller
INVENTORS
John B. Nugent
Henry G. Gilbert
BY
Toulmin & M. Carty
Their ATTORNEYS (No Model.) 4 Sheets—Sheet 2.
J. B. NUGENT & H. G. GILBERT.
GRAIN DRILL.
No. 499,849. Patented June 20, 1893.
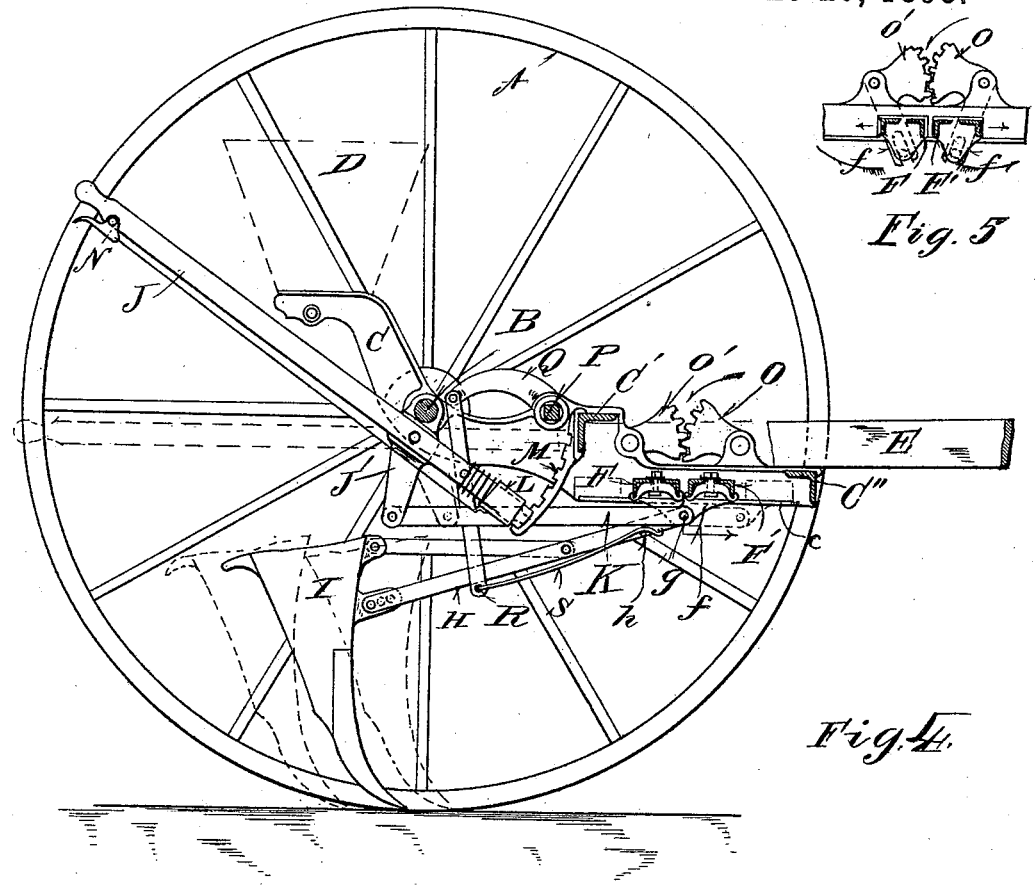
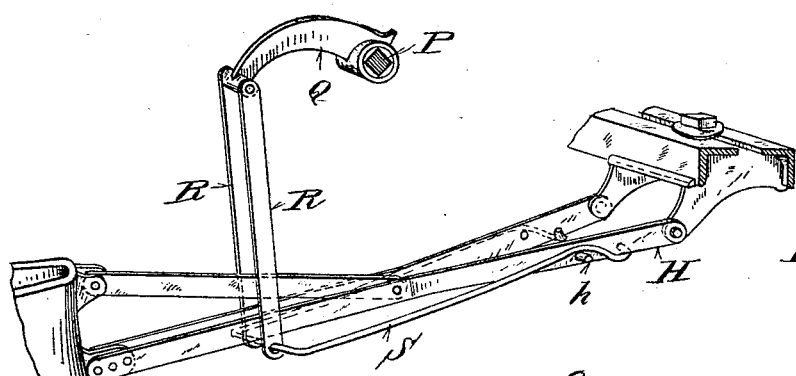
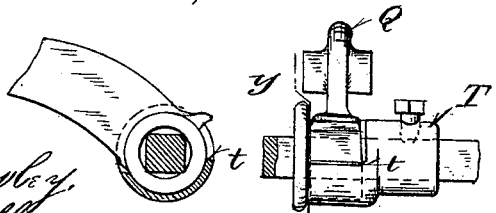
WITNESSES:
Jas. C. Hawley.
John C. Hiller.
INVENTORS
John B. Nugent.
Henry G. Gilbert.
BY
Toulmin & McCarty,
their ATTORNEYS
THE NORRIS PETERS CO., PHOTO-LITHO., WASHINGTON, D.C.

(No Model.) 4 Sheets—Sheet 3.
J. B. NUGENT & H. G. GILBERT.
GRAIN DRILL.
No. 499,849. Patented June 20, 1893.
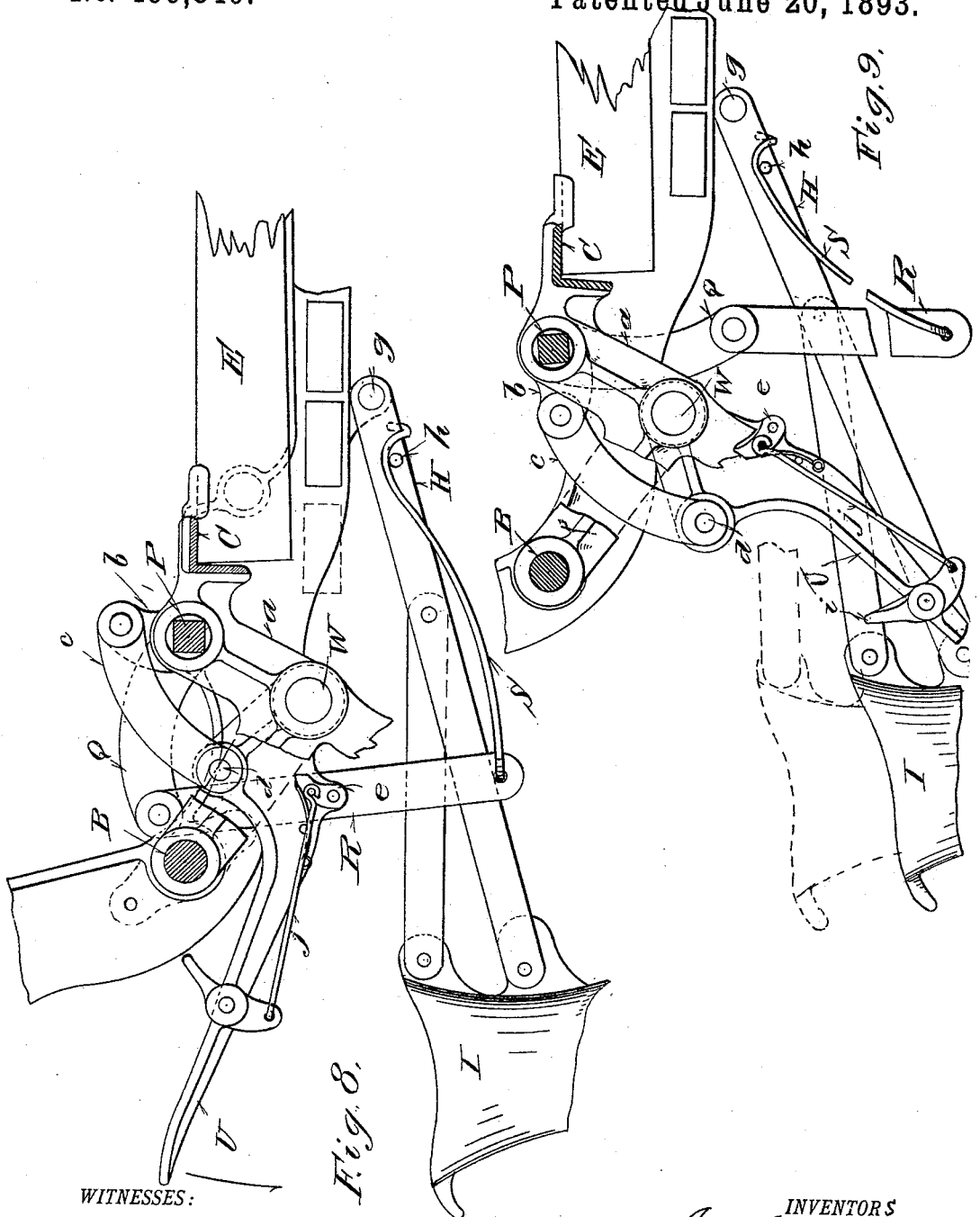
WITNESSES:
Jas. C. Dawley,
John A. Hiller
INVENTORS
John B. Nugent
Henry G. Gilbert
BY Toulmin & McCarty
Their ATTORNEYS (No Model.) 4 Sheets—Sheet 4.

J. B. NUGENT & H. G. GILBERT.
GRAIN DRILL.

No. 499,849. Patented June 20, 1893.

WITNESSES:
Jas. C. Dawley,
John A. Hiller

INVENTORS
John B. Nugent
Henry G. Gilbert
BY
Toulmin & McCarty
THEIR ATTORNEYS

UNITED STATES PATENT OFFICE.

JOHN B. NUGENT AND HENRY G. GILBERT, OF DAYTON, OHIO, ASSIGNORS TO THE McSHERRY MANUFACTURING COMPANY, OF SAME PLACE.

GRAIN-DRILL.

SPECIFICATION forming part of Letters Patent No. 499,849, dated June 20, 1893.

Application filed November 21, 1892. Serial No. 452,614. (No model.)

*To all whom it may concern:*

Be it known that we, JOHN B. NUGENT and HENRY G. GILBERT, of Dayton, county of Montgomery, State of Ohio, have invented a new and useful Improvement in Grain-Drills, of which the following is a specification.

Our invention relates to certain new and useful improvements in grain drills.

The object of our invention is to improve the mechanism for operating a grain drill.

To this end our improvements consist of the construction and permanent arrangement of a comparatively low carrying frame which is adapted to use upon comparatively large wheels, and a proper angle of the hoe obtained; of means for operating and adjusting said hoes, and to other points that will hereinafter appear in the specification, and are illustrated in the drawings, of which—

Figure 1, represents a plan view of our improved grain drill showing different spacements and arrangement of hoes; Fig. 2, detail, side and perspective views of our form of clip for connecting the drag bars to the shift rails; Fig. 3, a plan view of a double form to support both drag bars from one casting; Fig. 4, a vertical sectional view along the line $x\,x$ of Fig. 1 looking to the right; Fig. 5, a detail view of the connecting mechanism to operate the drag bars simultaneously; Fig. 6, a perspective view of the drag bars and their connections; Fig. 7, detail views of a rocker arm and its operating collar mounted on a rock shaft; Fig. 8, an enlarged view of the depressing mechanism with the lever in its upper position; Fig. 9, a view of the same parts with the lever in its lower position and bringing pressure on the hoes; Fig. 10, an enlarged view of the lifting mechanism with the hoes resting on the ground; and Fig. 11, a view of the same parts with the hoes raised and the lifting lever in its lower position.

The letters A A represent carrying wheels for the frame of the grain drill and are mounted on an axle B passing through side brackets C C which support the feed box D in an elevated position at the rear, and extend downward and forward as shown in Fig. 4, and are stayed by cross rails C' C'' to constitute a rigid rectangular frame.

A draft pole E is secured to the center of the frame to which the draft animals are hitched by the usual means (not shown). As seen from Fig. 4, these brackets are fixed to and bring the front parts of the frame low down for the attachment of the hoes as will presently be described, and thus allow the use of a large carrying wheel while preserving the proper inclination of the hoes to the ground. The forward portion of the frame at the sides of the said brackets, is provided with guide ledges $c$ on which are carried the shift-rails F F' consisting of angle irons mounted in end brackets $f$ so as to present a slot transversely to the machine as shown in the plan view, Fig. 1. To these rails are adjustably secured shift-rail clips G provided with pins or projections $g$, to which are secured the drag bars H, attached to the hoes I and adjustable in the usual manner as to their inclination to the ground.

Referring to Fig. 2, the sectional view of the shift-rail shows the attachment of the clip thereto by bolt and nut; in the perspective portion of the same view, the channels that embrace the lower edges of the angle irons are clearly shown together with the stud or pin, $g$, carried by the downward and laterally extending lip G' which brings the center of said pin to one side of the rail and the rails are closed, as shown in Fig. 1. The pins $g$ will be all in one center line, and the hoes will be likewise arranged. In order to shift the hoes so that they will alternate in their location with regard to the frame, the shift-rails are separated by operating the shifter lever J mounted on the axle B by a bracket arm J', Fig. 4, the lower end of which is connected by a link K with one of the pins $g$, or otherwise attached to one of said shift-rails. The lower end of the lever J is provided with a sliding spring-actuated collar L having a finger engaging with the segment M carried by the cross bar C' or otherwise, such collar being drawn back by the usual trip handle N and connecting wire. The handle J and the crank portion J' form a bell-crank lever and may be in parts, as shown, or otherwise constructed.

In Fig. 4, the dotted position of the handle J indicates the operation of the lever to throw the shift-rail F' forward, and by such action the companion rail F is thrown backward by interconnecting mechanism with the actuating rail. Such mechanism is shown in Figs. 4 and 5 and consists of intermatching crank segments O O' slidingly connected with their respective rails by slots and pins on the brackets f carrying said rails. The dotted position of the hoes in Fig. 4 show the alternate arrangement which thus results. The leverage obtained by this arrangement and construction of the parts, promotes the easy operation of the rails. The slot formed by the channel bars in such rails extends the entire length thereof, and allows of the adjustment of the clips at any convenient distance apart.

Referring again to Figs. 1 to 3 inclusive, we have shown a clip in a single and a double form, the single form illustrated in Fig. 2 having one pin for one drag bar and the double form as in Fig. 3 having two pins for the pair of drag bars of each hoe. One or more bolt holes may be used for attachment of the same to the rails. It will be seen that the same form of clip is used for both rails by merely reversing the clip to bring the point g to the front or the rear as required.

We provide two operating mechanisms, one to press the hoes into the ground and the other to raise them out of contact therewith. The hoes are pressed into the ground by a spring action, through their connection with a rock shaft P which carries a series of rocker arms Q, each connected by a double link R with one end of a double spring S, the other end of which passes over a pin h and turns up under the drag bars, as shown in Fig. 6. The spring S may be in one piece and the end at which the link is secured may be in the form of a bight as shown in Fig. 6, or separate springs may be used. The long yielding arm from the pin h to the link R, however, gives a strong spring pressure upon the hoes, forcing them firmly into the ground yet allowing of their springing up under undue strain thereon. The rocker arms Q are mounted in a sleeve or collar T set-screwed to the rocker shaft, as shown in Fig. 7, and a spur on the arm is engaged by the side of an opening t in the collar. When the shaft is rocked by presser mechanism, about to be described, the play afforded between the arm and the collar by means of this slot and spur engagement, equalizes any slight misadjustments of the parts and allows of some rotation of the shaft before it acts on the rocker arms, the springs and the hoes. In the view, Fig. 7, the rocker arm engages loosely with the shaft, and the collar in which it fits, maintains it in proper position on the shaft over the matching drag-bars.

Figure 11:
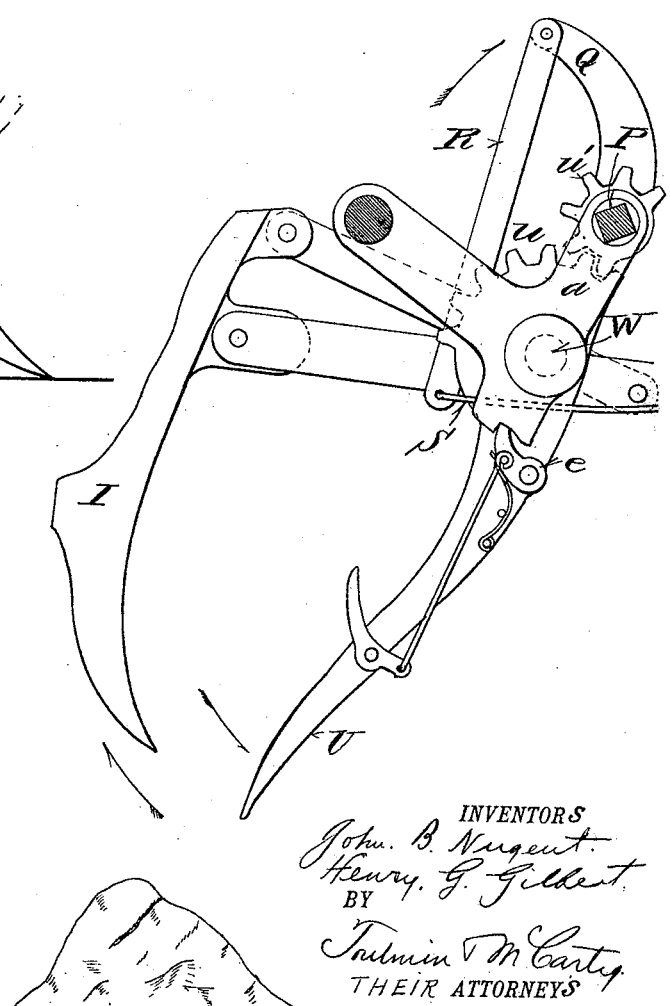

Referring to Figs. 8 and 9 the upper and lower positions of the presser mechanism will be described. A presser lever U adapted for operation by the foot of the rider from the seat shown in dotted position V, Fig. 1, is fulcrumed on a stud W from the bracket a carried by the two shafts B and P which are rotatively mounted in bosses above the stud W, as shown in Fig. 8. The rock shaft P has a crank arm, b, which is connected by a link c with the presser lever at d. The construction shown, illustrates a bent lever as the preferred form of presser lever, and the link is curved to prevent interfering with adjacent parts. A pressure of the foot on the lever U will thus rotate the rock shaft, and bring a spring pressure upon the hoes through the spring, link and arm connections, S, R and Q as before described. Fig. 9 shows such lower position of the pressure mechanism, which is maintained by the trip catch e on the lever engaging with notches in the bracket A. One or more notches may be used to vary the amount of pressure on the hoes. The trip catch is freed by means of a trigger i connected by a rod j thereto, as shown in Figs. 8 and 9. The mere act of freeing the catch, however, will not raise the hoes from the ground, and such action is accomplished by a lifting mechanism which will now be described. In Figs. 10 and 11 we have shown such lifting mechanism in two positions. A similar bracket a serves to support a lifting lever U' provided with a toothed segment u on the other side of the pivot stud W. The rock-shaft P carries a matching segment u', secured thereon, which meshing with the segment u is driven thereby and rocks the shaft reversely when the lifting lever U' is pressed downward in the direction of the arrow, Fig. 10. This reverse action of the rocker-shaft throws upward the rocker arms Q and raises the hoes by the action of the links R and spring S. Fig. 10 shows the position of the ends of the lifting lever and hoe dotted, and Fig. 11 shows the position of the parts in full lines. A trip catch similar to that on the other lever, maintains the lifting lever in its lower position and the hoes in their lifted position. On pressing the trigger with the foot, the weight of the hoes will cause them to descend, and a further pressure by means of the presser lever, will force them into the ground as before described. The advantage of thus operating the hoes by foot levers will be apparent; the mechanism above described, however, may be actuated otherwise than by the pressure of the foot without departing from the principle of our invention and we do not limit the operation of the pressing and lifting levers to the use of the foot alone; such, however, is the preferred form and construction. It will be observed that the levers are all within convenient reach of the driver when mounted on the seat; in the ordinary form of machine it is often necessary for him to dismount in order to operate the forms of mechanism employed in other machines. By our construction, however, it will be seen that any obstruction suddenly met with, as rock or roots, may be quickly avoided without stopping the travel of the drill.

The locations of the lifting and pressure levers are shown in Fig. 1.

The adjustment of the lever bracket a, may be made to any convenient position on axle and shaft B P respectively, as may be required by the arrangement of the hoes, or convenience of the driver.

The improvements in the foregoing description may be used also in connection with a broad-cast seeder by changing somewhat, the locations of the lifting and pressing levers.

Having thus fully described our invention, what we claim as new, and desire to secure by Letters Patent, is—

1. In a grain drill, the combination with the carrying frame, having slots and guide ledges in the sides thereof; of shifting rails for the drag rods, connected by end brackets, so as to form a longitudinal slot extending the length of said rails, and transversely to the frame, the brackets being provided with pins, and adapted, to slide in said guide ledges, inter-matching crank segment gears pivoted to the sides of the frame so as to work in the slots therein, the crank portion of said segment gears having elongated slots with which the pins on the brackets engage, so that the shifting of one pair of rails actuates the other pair to a corresponding movement, substantially as described.

2. In a grain drill, the combination with the carrying frame having guide ledges, and slots in the sides thereof; of transverse shift rails fixed to brackets provided with pins and adapted to slide in the guide ledges, intermeshing crank segment gears pivoted to the sides of the frame in the slots therein, the crank of the segment gears having slots with which the pins of the shift-rail brackets engage, a shifting lever fixed to an arm bracket rotatably mounted on the main axle, a connecting link between said arm bracket and one set of the shifting rails, substantially as described.

3. The combination with the carrying frame having guide ledges and slots in the sides thereof; of transverse shifting rails fixed at their ends to brackets provided with pins, said brackets adapted to slide in the guide ledges in the frame, drag bar clips provided with channels in which the shifting rails are embraced, and pins to which the drag bars are attached, inter-matching segment gears pivoted to the frame so as to extend through the slots therein, said gears having cranks provided with slots with which the pins on the shift-rail brackets engage, a hand lever fixed to a bracket arm fulcrumed on the main axle, a link connection between said bracket arm and pin on the drag bar clip, whereby one set of shift rails are slidingly actuated, thereby correspondingly actuating the other set, substantially as described.

4. In a grain drill, the combination with the drag bars, hoe and carrying frame, the latter having low forward and high rearward portions, guide ledges and slots as described; of transverse shift rails fixed to end brackets in a manner to form a longitudinal slot between said rails extending the length thereof, said brackets having lateral pins, intermatching segment gears pivoted in the slots in said frame, said segment gears having a crank portion provided with a slot with which the bracket pins engage, drag bar clips bolted to said shift rails, having channels that embrace the lower edges of the rails, and one or more studs for attachment of the drag bars, substantially as described.

5. In a grain drill, the combination with the carrying frame, transverse shifting rails consisting of single bars fixed to brackets in a manner to form a longitudinal slot transversely to the frame, said brackets having laterally projecting pins; of crank segment gears mounted adjacent to said brackets, and operated thereby, drag bar clips carried by said slotted shift rails, having a downward and laterally projecting web provided with a stud or pin for attachment with the drag bars, a hand lever fixed to a bracket arm fulcrumed on the main axle, a connecting link pivoted to said bracket arm, and to the lug or pin on the drag bar clip, whereby the shifting rails are actuated and likewise the hoes, substantially as described.

6. In a grain drill, the combination with the carrying frame, and shift rails fixed to brackets slidingly mounted therein, and crank segment gears pivoted to the sides of said frame operated by said brackets, drag bar clips with channels and pins secured to said shift rails as described; of a shifting lever fixed to a bracket arm rotatably mounted on the axle of the frame, a segment trip catch for interlocking said lever, a link connecting said bracket arm with a pin on the shift rail clip, whereby motion is imparted to the hoes, substantially as described.

7. In a grain drill, the stationary frame herein described consisting of side brackets extending upward rearwardly to support the seed box, and forward, downwardly to provide a suitable angle for the drag bar and hoes in connection with the use of a large size carrying wheel, the forward portion of said frame having guide ledges and slots for the shift rail mechanism, and a fixed attachment with cross rails to complete a rectangular frame, substantially as described.

8. In a grain drill, the combination with the carrying frame, hoes and drag bars, a main axle, and a rock shaft transverse to the frame, of an adjustable bracket loosely carried by said frame and rock shaft, and provided with a stud, a lifting lever fulcrumed on said stud having a toothed segment at one end, a matching segment, and rocker arms fixed to said rock shaft, the double link R, pivoted to said rocker arms, and the double spring S, one end of which is connected to said double link and the other end passed over the pin $h$ on the drag bars, and under said drag bars, substantially as described.

9. In a grain drill, the combination with the carrying frames, hoes and drag bars pivotally connected to said frame as described, the rock shaft with the fixed segment pinion $u'$; of the rocker arm Q fixed to said rock shaft, the double link R pivoted to said rocker arm, the double spring S attached to said double link, and to the drag bars, by being passed over pins $h$ and under said drag bars, a pressure lever provided with a segment gear adapted to mesh with the pinion $u'$, substantially as described.

10. In a grain drill, the combination with the drag bars, of a hoe, and lateral pins thereon near their forward pivot point, of a spring formed in a loop and extending rearward over said pins and under said bars at its forward and rear limits, and means to act upon the rearward end of said spring, substantially as described.

11. In a grain drill, the combination with the carrying frame, a hoe, and a drag-bar pivotally connecting said hoe to the frame, and pins or projections from said bars near their forward ends, of a double-armed spring in the form of a loop, extending over said pins or projections and under said drag bars at both its forward and rear limit, a double link engaged to the rear of said spring, a rock arm for said link, a rock-shaft carrying said arm, a downwardly acting lever to rock said arm in one direction, a spring pressure on the drag bar, and another lever to rock the shaft in the other direction and raise the said drag bar and hoe by the engagement of the spring and links therewith.

In testimony whereof we have hereunto set our hands this 8th day of November, 1892.

JOHN B. NUGENT.
HENRY G. GILBERT.

Witnesses:
GEORGE H. WOOD,
CHARLES E. MENTEL.